US012339879B2

United States Patent
Docherty et al.

(10) Patent No.: US 12,339,879 B2
(45) Date of Patent: Jun. 24, 2025

(54) MANAGING SEARCH REQUESTS

(71) Applicant: ThinkAnalytics Ltd., Lanarkshire (GB)

(72) Inventors: Peter Docherty, Glasgow (GB); Christopher McGuire, Glasgow (GB); Alan Ryman, Glasgow (GB); Shahad Ahmed, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 6 days.

(21) Appl. No.: 18/130,882

(22) Filed: Apr. 4, 2023

(65) Prior Publication Data
US 2024/0338394 A1    Oct. 10, 2024

(51) Int. Cl.
| | |
|---|---|
| *G06F 16/332* | (2025.01) |
| *G06F 16/31* | (2019.01) |
| *G06F 16/334* | (2025.01) |
| *G06F 16/335* | (2019.01) |
| *G06F 16/732* | (2019.01) |
| *G06F 16/735* | (2019.01) |

(52) U.S. Cl.
CPC ........ *G06F 16/3326* (2019.01); *G06F 16/313* (2019.01); *G06F 16/3341* (2019.01); *G06F 16/335* (2019.01); *G06F 16/732* (2019.01); *G06F 16/735* (2019.01)

(58) Field of Classification Search
CPC .... G06F 16/732; G06F 16/735; G06F 16/335; G06F 16/3341; G06F 16/313; G06F 16/3326
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |
| 9,699,491 B1 | 7/2017 | Docherty et al. |
| 9,756,390 B1 | 9/2017 | Docherty et al. |
| 9,906,837 B1 | 2/2018 | Docherty et al. |
| 9,973,797 B1 | 5/2018 | Docherty et al. |
| 10,091,555 B1 | 10/2018 | Docherty et al. |
| 10,289,739 B1 | 5/2019 | Docherty et al. |
| 10,356,035 B1 | 7/2019 | Gravino et al. |
| 10,412,454 B2 | 9/2019 | Docherty et al. |
| 11,212,584 B2 | 12/2021 | Docherty et al. |
| 11,343,573 B2 | 5/2022 | Docherty et al. |
| 2002/0129012 A1* | 9/2002 | Green ................ G06F 16/313 707/E17.084 |
| 2003/0106064 A1 | 6/2003 | Plourde |
| 2007/0130136 A1* | 6/2007 | Cambot ................ G06F 16/25 |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Marc S Somers
(74) *Attorney, Agent, or Firm* — Foley & Lardner LLP

(57) ABSTRACT

A method of managing search requests to a content recommendation engine (CRE) is provided. The CRE is adapted to receive search requests and provide one or more content recommendations based on the received search requests for a user of a content distribution system having a plurality of users. The method comprises receiving an inputted search term; setting one or more search parameters based on the search term; and generating a search request based on the inputted search term and the search parameters.

22 Claims, 6 Drawing Sheets

(56) References Cited

U.S. PATENT DOCUMENTS

| | | |
|---|---|---|
| 2007/0157222 A1 | 7/2007 | Cordray et al. |
| 2008/0222106 A1* | 9/2008 | Rao .................. H04H 60/46 |
| 2008/0304812 A1 | 12/2008 | Jin |
| 2008/0319942 A1* | 12/2008 | Courdy .................. G06Q 10/10 |
| 2010/0005492 A1 | 1/2010 | Takano et al. |
| 2010/0070507 A1 | 3/2010 | Mori |
| 2010/0162175 A1* | 6/2010 | Lee .................. G06F 3/0482 |
| | | 707/E17.014 |
| 2011/0243529 A1 | 10/2011 | Oryoji et al. |
| 2011/0289534 A1* | 11/2011 | Jordan .............. H04N 21/4668 |
| | | 725/48 |
| 2013/0080472 A1* | 3/2013 | Cohen .................. G06F 16/243 |
| | | 707/E17.128 |
| 2014/0149344 A1 | 5/2014 | Pudipeddi et al. |
| 2014/0279756 A1 | 9/2014 | Whitman |
| 2015/0082330 A1 | 3/2015 | Yun et al. |
| 2015/0100987 A1 | 4/2015 | Whitman et al. |
| 2015/0234820 A1* | 8/2015 | Aravamudan ..... H04N 21/4826 |
| | | 707/769 |
| 2015/0269488 A1 | 9/2015 | Galai et al. |
| 2015/0347590 A1* | 12/2015 | Kamotsky ............. G06F 16/242 |
| | | 707/723 |
| 2017/0083615 A1* | 3/2017 | Boguraev ............. G06F 40/211 |
| 2017/0311015 A1* | 10/2017 | Docherty ........... H04N 21/4312 |
| 2018/0173798 A1* | 6/2018 | Dupey .................. G06F 16/335 |
| 2020/0252690 A1 | 8/2020 | Docherty et al. |
| 2021/0157813 A1* | 5/2021 | Hammad .......... G06F 16/24553 |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

\* cited by examiner

Configuration File

```xml
<?xml version="1.0" encoding="UTF-8"?>
<AdaptiveSearchConfig xmlns:xsi="http://www.w3.org/2001/XMLSchema-instance" xsi:noNamespaceSchemaLocation="AdaptiveSearchConfig.xsd">
   <TermConfig termLength="1" addPhrase="true" useAnd="false">
      <SortMode mode="relevance"/>
      <Popularity enabled="true">
         <PopularityScale>1</PopularityScale>
      </Popularity>
      <Wildcard enabled="true" maxWordLength="1" value="*"/>
      <BoostWatchedSeries enabled="true">
         <PrevEpisodeWeight>0.6</PrevEpisodeWeight>
         <NextEpisodeWeight>0.9</NextEpisodeWeight>
         <FutureEpisodeWeight>0.75</FutureEpisodeWeight>
      </BoostWatchedSeries>
      <SearchFields>
         <Fieldname>title</Fieldname>
         <Fieldname>seriestitle</Fieldname>
      </SearchFields>
   </TermConfig>
   <TermConfig termLength="2">
...
```

Figure 5

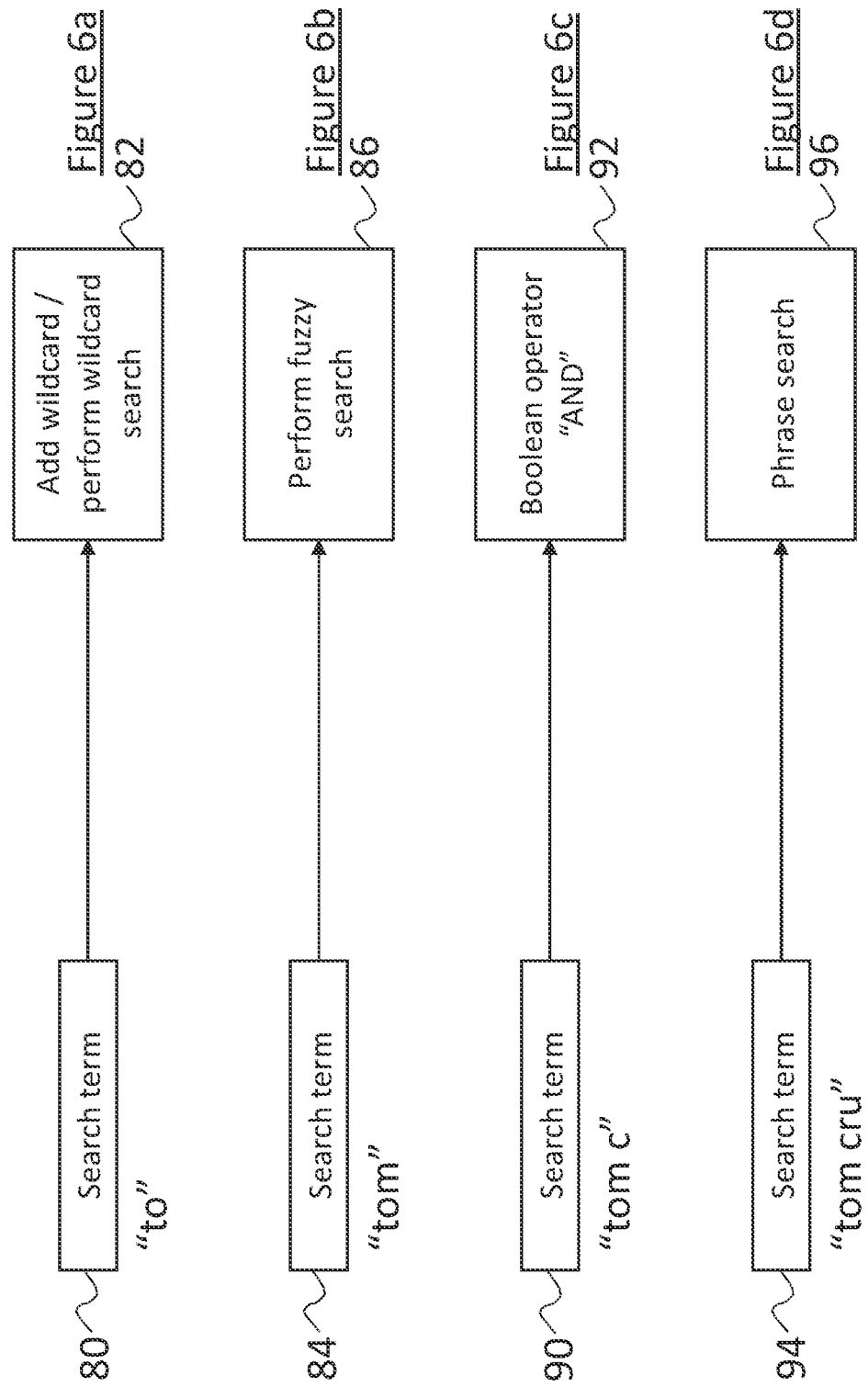

MANAGING SEARCH REQUESTS

TECHNICAL FIELD

The present disclosure relates generally to a content recommendation system and method, and in particular, to a method and system of managing search requests.

BACKGROUND

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers.

For example, personal video recorders have the capability of recording and storing content items from live linear television broadcasts and downloading and storing content items from video on demand services. As such, the content items stored on such devices provide a content source that is unique to the owner of the personal video recorder.

It has been suggested to provide viewers with content recommendations, which may lead them more rapidly to content that may be of interest. For example, applicant's own U.S. Pat. No. 11,343,573, the relevant portions of which are incorporated herein, describes such a content recommendation system.

Such a recommendation system may be based on user data and/or an input search term. Inputting a search term may be cumbersome, difficult and/or time consuming. Improvements and/or alternatives for searching and finding desired content are accordingly desired. Accordingly, it is an object of this disclosure to address or ameliorate one or more of these issues.

Such a recommendation system may be based on user data. However, the size of stored user data may be unwieldly when compared with the number of content recommendation requests. Improvements and/or alternatives are accordingly desired.

SUMMARY

In TV systems, or other systems for provision of content to a user, each service provider may have thousand, tens or hundreds of thousands, or millions of customers, wherein each customer is unique and may have different viewing habits and preferences. The large choice of content and the increased variety of content sources has led to various technical developments to enable users to better access and select content, for example developments to electronic programme guides (EPGs). For example, viewers may filter the large choice of content using a search function.

However, the search function may be difficult and time consuming to operate, especially with a conventional television remote. The search function may require users to select enter each character in the title of a program (content) they wish to view with a television remote in order to be presented with the program for viewing. This may lead to users not finding their desired content or taking too long to find the desired content. This may cause users to leave the service provider for another provider, i.e., user churn.

Accordingly, improvements and/or alternatives in the search function are desired.

According to an aspect of the disclosure there is provided a method of managing search requests to a content recommendation engine (CRE), the CRE adapted to receive search requests and provide one or more content recommendations based on the received search requests for a user of a content distribution system having a plurality of users, the method comprising:
  receiving an inputted search term;
  setting one or more search parameters based on the search term; and
  generating a search request based on the inputted search term and the search parameters.

The search request may modifying the ordering of content, i.e., the content catalogue, being searched. This may improve the search outcome, i.e., result in more relevant content recommendations. For example, if the search term is "to", the search parameter may be a wildcard as a result of the search term being less than 3 characters. The wildcard parameter may add a wildcard to the search term. The generated search request includes not only the search term, "To", but also the wildcard "*" before and/or after the search term. The search request is then used to search the catalogue via a wildcard search and is more likely to return relevant content to the user.

In another example, if the user continues to enter characters such that the inputted search term is "Tom", the parameters may be set to: wildcard=no (which may switch the search to a fuzzy search) and search field=actor. The wildcard parameter is set to no based on the number of characters being 3 or greater indicating the user is more likely to know exactly what they are searching for. The search field parameter is set to search field=actor based on the search term being the name of several popular actors which may indicate the intent of the user when entering the term. The search request may thus be generated as "Tom" and search field=actor. The search performed based on this search request may present content including actors with the name "Tom" before content having a title starting with "Tom", for example. This may result in content being presented to the user which is more likely to be relevant to the user. Thus the user may be presented with more relevant content while not required to enter numerous keystrokes. This may reduce user churn.

In another example, if the user continues to enter characters such that the inputted search term is "Tomorrow", the parameters may be set to: wildcard=no and search field=title. Further, a search parameter fuzzy=no may disable a fuzzy search. If zero results are returned in response to search request, the search parameter fuzzy may be re-enabled and set to yes to make the search request a fuzzy search and increase the number of search results.

The search term may be text-based. The search term may be audio. In other words, a user may input audio. The audio may be converted to text via a text-to-speech module. The text-to-speech module may form part of a content recommendation or the content distribution system, or may be external to these systems.

The search term may be inputted by a user via a user interface. The user interface may be web-based.

The inputted search term may comprise one or more characters. The characters may comprise words or phrases including text characters such as: a, b, c, E, F, G, spaces, etc. The character set may not be limited to ASCII/Latin characters, but could be other characters such as Cyrillic. The search term may comprise a series of characters separated by one or more spaces, or not separate by spaces in languages such as Mandarin.

Setting the search parameters comprises setting the search parameters based on a user profile. A user profile may comprise or be formed from a set of user data generated based on selections or other actions by a user. For example, the user may have previously viewed content in the mystery and true crime genres. The user profile may accordingly indicate a proclivity to these genres.

In some embodiments, a search request may be generated while restricting or not allowing access to personal information, or data that could be used to determine the name of a user, or demographic information concerning the user. This will ensure user anonymity and privacy are maintained. For example, the user profile may be scrubbed of any personal information prior to use in setting the search parameters to restrict access to personal information. Alternatively or additionally, the user profile may contain no such personal information such user age, date of birth, address, etc., The user profile may simply provide an indication of user content preferences.

The method may further comprise determining the number of characters in the inputted search term. This may comprise first converting the search term to text prior to determining the number of characters.

Setting the search parameters may comprise setting the search parameters based on the determined number of characters. For example, if the number of characters is less than 3, the wildcard parameter may add a wildcard characters to the inputted search term and indicate a wildcard search is to be performed. However, if the number of characters is more than 3, the wildcard parameter may indicate a fuzzy search is to be performed instead. A fuzzy search or approximate string matching may result in a search request that approximately matches the inputted search term, rather than exactly matches the search term.

The search parameters may comprise at least one of sort mode, search field, wildcard, popularity, boost watched series, Boolean operator, and phrase search. Which particular search parameters are set may be determined based on the inputted search term. Alternatively, which search parameters are set may be pre-set prior to the search term being inputted and/or received.

The sort mode may determine how results of a content search based on search request are to be displayed.

The method may further comprise setting the sort mode based on the inputted search term. The method may further comprise setting the sort mode, based on the inputted search term, to one of:

alphabetical, popularity, relevance, ascending, descending, and preferences.

Relevance may result in search results being displayed according to relevance, i.e., most relevance content being displayed before less relevant content. Ascending may result in search results being displayed according to ascending date order such that the oldest search results are displayed first, and the newest search results are displayed later. Descending may result in search results being displayed according to descending date such that the newest (chronologically) search results are displayed first, and the oldest search results are displayed later. Preferences may result in search results being displayed according to user preferences. Alphabetical may result in search results being displayed according to alphabetical order. Popularity may result in search results being displayed according to popularity amongst a plurality of users.

The sort mode search parameter may be based on a user profile in addition to the search term. The user profile may indicate a proclivity for more recent content such that the sort mode is set to descending date to displayed the newest search results first so the user is more likely to see content of interest as a result of their search.

The method may further comprise setting the search field based on the inputted search term. The method may further comprise setting the search field based on the inputted search term, to one or more of:

title, description, series title, actor, director, genre, mood, style, theme, keywords, people, and description. Based on the inputted search term, the method may determine what the search field should be set of the above items. For example, if the user enters "The" as the search term, the search field parameter may be set to title as it is more likely the user is searching for a particular content title starting with "The".

The method may further comprise setting the wildcard based on the inputted search term. The method may further comprise setting the wildcard, based on the inputted search term, to one or more of:

add wildcard before search term, add wildcard after search term, both wildcards, and no wildcard.

Adding wildcard before search term may result in a search request which includes the search term with a wildcard character before the search term. Adding the wildcard after the search term may result in a search request which includes the search term with a wildcard character after (i.e., the following character at the end of) the search term. No wildcard does not introduce any wildcard to the search term, while both wildcards introduces wildcard characters to both the start and the end. The wildcard parameter may be set based on a length of the inputted search term. For example, if the search term is 1 character long, the wildcard search parameter may be set to both wildcards to improve the likely of the relevant search results being returned by the search request. If the search term is 5 characters long, the wildcard search parameter may be set to no wildcard. No wildcard may result in the search request resulting in a fuzzy search if a search parameter fuzzy is explicitly enabled. The wildcard search parameter may thus change as the number of characters in the inputted search term increase.

The method may further comprise setting the popularity based on the inputted search term. The method may further comprise setting the popularity, based on the inputted search term, to one or more of:

applying a weight to one or more content items.

The weight may be greater than a default weight. For example, for content which has been pre-set or found to be popular among users, or among users having a similar user profile as the user entering the inputted search term, an increased weight may be applied to this content. This will result in the content being more likely to appear as a search result to the search request. The popularity search parameter may be set based on the user profile. If the user profile indicates a proclivity to popular content, the popularity search parameter may be set to apply the increased weight to popular content. The popularity search parameter may be set based on a length of the inputted search content. For example, if the length is small, e.g., 1 character, the popularity search parameter may apply the increased weight as the user is unlikely to know the specific content of interest. If the length is large, e.g., 5 characters, the popularity search parameter may not apply the increased weight as the user is likely to know the specific content of interest.

The method may further comprise setting the boost watched series based on the inputted search term. The method may further comprise setting the boost watched series, based on the inputted search term, to one or more of:
applying a weight to one or more content items.

The boost watched series search parameter may increase a weight above a default weight applied to content a user has previously-viewed. Specifically, the boost watched series search parameter may increase a weight above a default weight applied to a series the user has previously-viewed. If a user previously-viewed a series they may be more likely in re-watching the series, or watching the next or previous episode in the series. As such, if the inputted search term is determined to be previously-viewed content, the boost watched series search parameter may be set to boost this previously-viewed content.

The boost watched series search parameter may be pre-set prior to a user entering the inputted search term or the search term being received. The content recommendation system may be pre-set to boost content the user has previously viewed as the user is likely to be interested in re-watching content, specifically episodes of a previously-used series.

The content items comprise a previously-viewed content item. Specifically, the content items may comprise a previously-viewed series, e.g., episodic program rather than a film.

The method may further comprise setting the Boolean operator based on the inputted search term. The method may further comprise setting the Boolean operator, based on the inputted search term, to one of
AND, and OR.

The Boolean operator search parameter may be set based on a length of the inputted search term. For example, if the inputter search term has more than 5 characters the Boolean operator may be set to AND as a user is more likely to want to see two words together, rather than either one of the words. The Boolean operator search parameter may be set based the presence of one or more spaces in the inputted search term. Specifically, the Boolean operator search parameter may be set to AND if one or more spaces are present in the inputted search term. The Boolean operator search parameter may be set to OR by default.

The method may further comprise setting the phrase based on the inputted search term. The method may further comprise setting the phrase, based on the inputted search term, to one of:
True or false.

The phrase search parameter may be set based on a length of the inputted search term. The phrase search parameter may be set based on the term containing one or more spaces. The phrase search parameter may be set to True (indicating the search term is a phrase) if one or more spaces are present in the search term. The phrase search parameter being set to True may result in the search request looking for the entire inputted search term as a phrase, rather than separate words separately.

Setting the search parameter may comprise generating a configuration file. The configuration file may be in the XML file format. The configuration file may compile all of the mentioned search parameters, e.g., sort mode, search field, wildcard, popularity, boost watched series, Boolean operator, and phrase search.

Generating the search request may comprise generating the search request based the inputted search term and the configuration file.

The search request may be formed or defined by the inputted search term and the search parameters.

The method may further comprise:
sending the search request to a content recommendation engine for providing one or more content recommendations.

The method may further comprise:
conducting a content search based on the search request. The content search may search through a number of content sources, e.g., pay-tv, video on-demand (VOD), etc.

Conducting the content search may comprise conducting a wildcard search or a fuzzy search. The search may be a wildcard search or fuzzy search based on the wildcard search parameter.

The method may further comprise:
inputting the search term.

According to another aspect there is provided a non-transitory computer-readable medium having computer program code stored thereon, the program code executable by a processor to perform the described method. This may include any of the additionally described features aspects or features of the method.

According to another aspect there is provided a content recommendation system comprising an adaptive search module for managing search requests to a content recommendation engine (CRE), the CRE adapted to receive search requests and provide one or more content recommendations based on the received search requests for a user of a content distribution system having a plurality of users, the adaptive search module configured:
receive an inputted search term;
set one or more search parameters based on the search term; and
generate a search request formed based on the inputted search term and the search parameters.

The adaptive search module may be further configured to:
send the search request to a content recommendation engine for providing one or more content recommendations.

The adaptive search module may be further configured to perform any of the steps described with respect to the described method.

The system may further comprise the CRE. The CRE may be configured to:
receive the search request from the adaptive search module; and
generate one or more content recommendations based on the search request.

According to another aspect there is provided a method of managing search requests to a content recommendation engine (CRE), the CRE adapted to receive search requests and provide one or more content recommendations based on the received search requests for a user of a content distribution system having a plurality of users, the method comprising:
  generating a search request based on:
    an inputted search term, and
    one or more search parameters, the parameters set based on the inputted search term; and
  sending the search request to a content recommendation engine for providing one or more content recommendations.

According to another aspect there is provided a method of managing search requests to a content recommendation engine (CRE), the CRE adapted to receive search requests and provide one or more content recommendations for a user of a content distribution system having a plurality of users based on the received search requests, the method comprising:
  receiving, from a user, a search term, the search term having a number of characters;
  modifying the number of characters of the search term;
  modifying a search type and/or parameter associated with the search term;
  sending the search term having the modified number of characters The described methods may be computer-implemented, i.e., implemented by a computer processor.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:
FIG. 5 is an exemplary configuration file;
and
FIGS. 6a-6d illustrate changes in the search parameters based on inputted search term.

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognized that each user may require different content recommendations. Applicant's own U.S. Pat. No. 11,343,573, the relevant portions of which are incorporated herein, describes a content recommendation system for providing content recommendations. The recommendations may be based on user data. Additionally, the recommendations may be based in a user inputted search term.

Tracking, recording and processing large volumes of customer data together with large amounts of content data in order to provide a personalized recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with over one million content recommendation demands per minute during busy periods.

Figure 1:
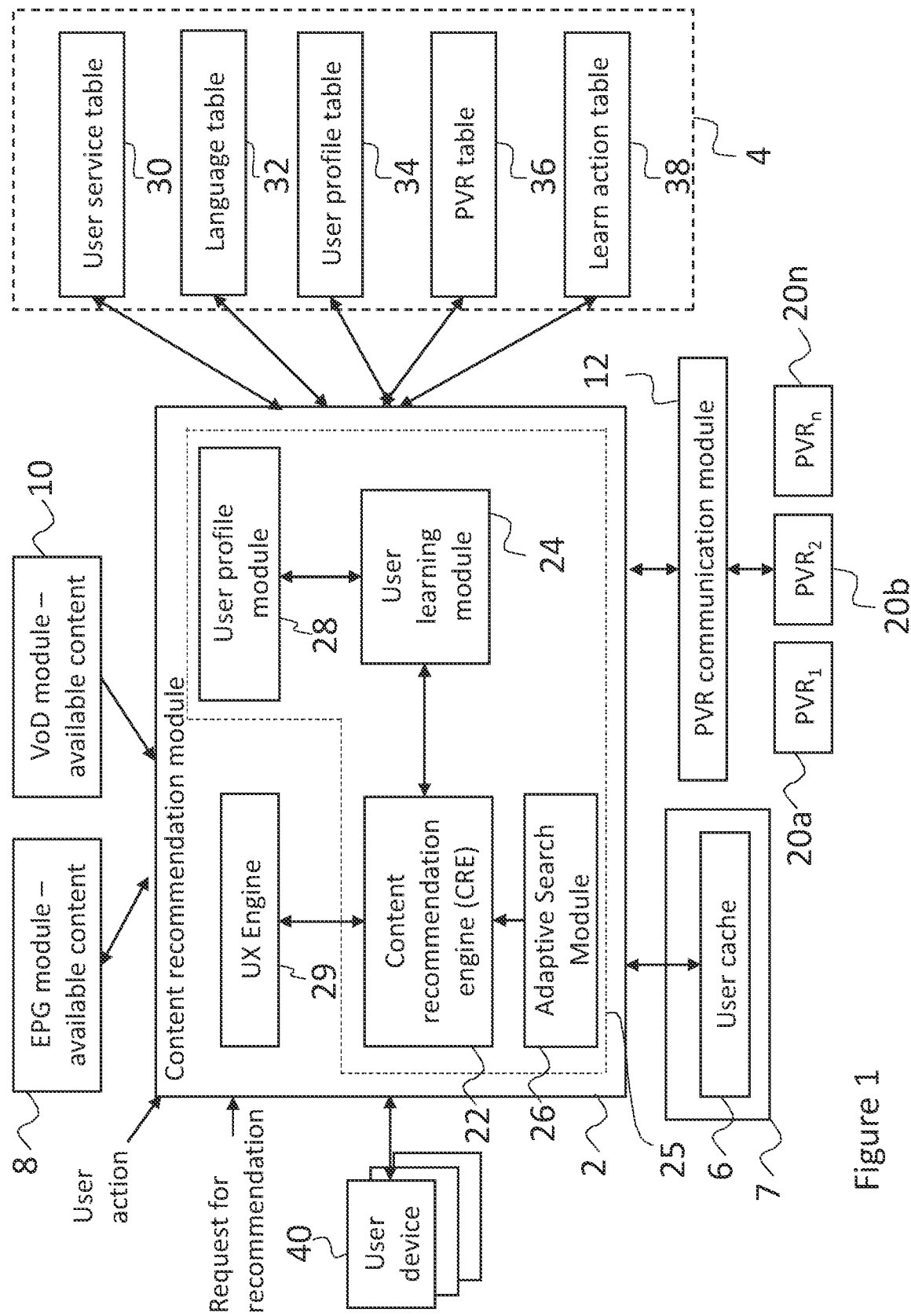
FIG. 1 is a schematic diagram of a digital content recommendation system.

FIG. 1 shows a schematic diagram of a digital content recommendation system according to an embodiment. The system is able to provide content recommendations in real time or near real time for many thousands, tens of thousands, hundreds of thousands, or even tens of millions, or more users. Example modes of operation are described below in relation to PVRs associated with users, but content recommendations may be provided to or in respect of any suitable users or user accounts, with recommended content being provided or accessible via any suitable devices, for example set-top boxes, smartphones, PCs or tablets or any other suitable content delivery mechanism.

The system comprises a content recommendation module 2 linked to a first storage resource in the form of a hard disk storage device 4, which is used to store various user data. The content recommendation module 2 is also communicatively linked to a second storage resource in the form of a local storage device that includes at least one cache, for example a user cache 6. In the embodiment of FIG. 1 the local storage device is in the form of RAM 7, but any suitable storage device may be used in alternative embodiments. The user cache 6 may be used for temporary storage of user data obtained from the hard disk storage device 4 during a content recommendation session, as discussed in more detail below. While the system has been illustrated and described as comprise first and second storage resources, one of skill in the art will appreciate more or less storage resources may be present. For example, the system may comprise a single storage resource. The storage resource may comprise a hard disk storage device.

The content recommendation module is able to communicate, either directly or indirectly, and either via wired or wireless connection, with very large numbers of users or user devices 40 and to provide recommendations for or derived from such users or user devices. Other than some PVRs which are shown schematically in FIG. 1, only a few user devices 40 are shown in FIG. 1 for clarity. The user devices 40 may include, as examples only, a user's mobile phone, smart TV, tablet computer, laptop, smart watch or other suitable viewing device. Although the user devices 40 could belonging to a user, they could also comprise any other device that the user is logged into.

The content recommendation module 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, Content Recommendation Module 2, the User Cache 6, the PVR Communication module 12 and the EPG module 8 are implemented in a server. The server includes communication circuitry that enables communication between the server, or appropriate components of the server with each of the user devices, and with the content sources, for example a TV service operator or other content service operator.

Any other suitable implementation of the EPG module 8, the VoD module 10, content recommendation module 2, the user cache 6, the PVR communication module 12 and the EPG module 8 may be provided in alternative embodiments, for example they may be implemented in any software, hardware or any suitable combination or software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the content recommendation system, such that additional metadata to that provided by the content sources or other external sources may be stored.

In the embodiment of FIG. 1 the content recommendation server, in particular the content recommendation module 2, communicates directly with each of the user devices, for example to receive user action data, to determine when a content recommendation is required for a particular user, and to supply content recommendations to the user devices. In alternative embodiments, the content recommendation module 2 communicates with the user devices via the content sources or via other servers or devices. For example, in such alternative embodiments, the user action data may be sent to the content recommendation server via one of the content source servers or other server or device, and the content recommendations may be sent to the user devices from the content recommendation module 2 via the content source servers or other server or device.

In the embodiment of FIG. 1 the system operates together with three sources of content for a user device: real-time linear television, for example terrestrial or satellite broadcast television; one or more video-on-demand (VOD) services, and pre-recorded video content stored on one or more personal video recorders (PVR). In alternative embodiments further sources of content as well as or instead of those shown may be used.

The operation of the digital content recommendation system is controlled by the content recommendation module 2. As can be seen in FIG. 1, the content recommendation module 2 is configured to communicate with the one or more content information modules: the electronic programme guide (EPG) module and VoD module 10. The content recommendation module 2 is also configured to communicate with the user cache 6 local to the content recommendation module 2, the hard disk storage resource 4 and the one or more PVRs. A data access layer provides a communication interface between the content recommendation module 2 and the hard disk storage resource 4. A personal video recorder (PVR) communication module 12 provides a communication interface between the one or more PVRs 20*a*, 20*b*, . . . 20*n* and the content recommendation module 2.

The content recommendation module 2 has a content recommendation engine (CRE) 22, a user learning module 24 and an adaptive search module 26. The content recommendation module 2 further includes a user profile module 28. The CRE 22, user learning module 24 and user profile module 26 may be included in a recommendation service 25.

The CRE 22 applies a set of processes to determine, in real time, content recommendations for a user based on user data, an inputted search term and available content. The user learning module 24 receives data indicative of selections or other actions by a user and builds up a set of user data, for example comprising or representing a user history or profile, which is stored in the hard disk storage 4, and which is used in generating personalized recommendations for the user. The adaptive search module 26 receives an inputted search term and generates a search request for the CRE 22. The CRE 22 receives the search request and conduct a search for content pursuant to the search request. Operation of the CRE 22, the user learning module 24 and the adaptive search module 26 is discussed in more detail below.

Figure 2:
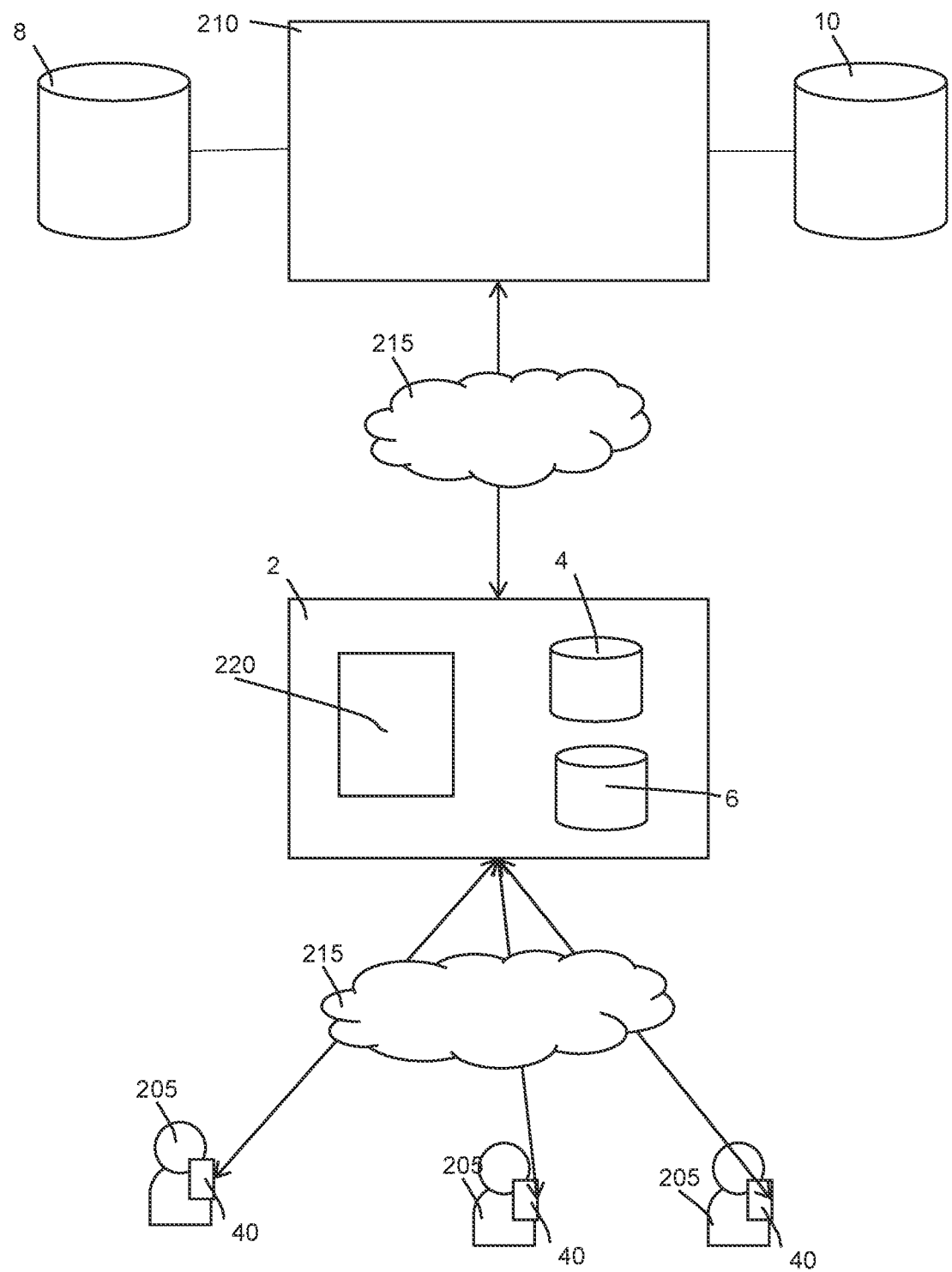
FIG. 2 is a simplified schematic of the system of FIG. 1.
Figure 3:
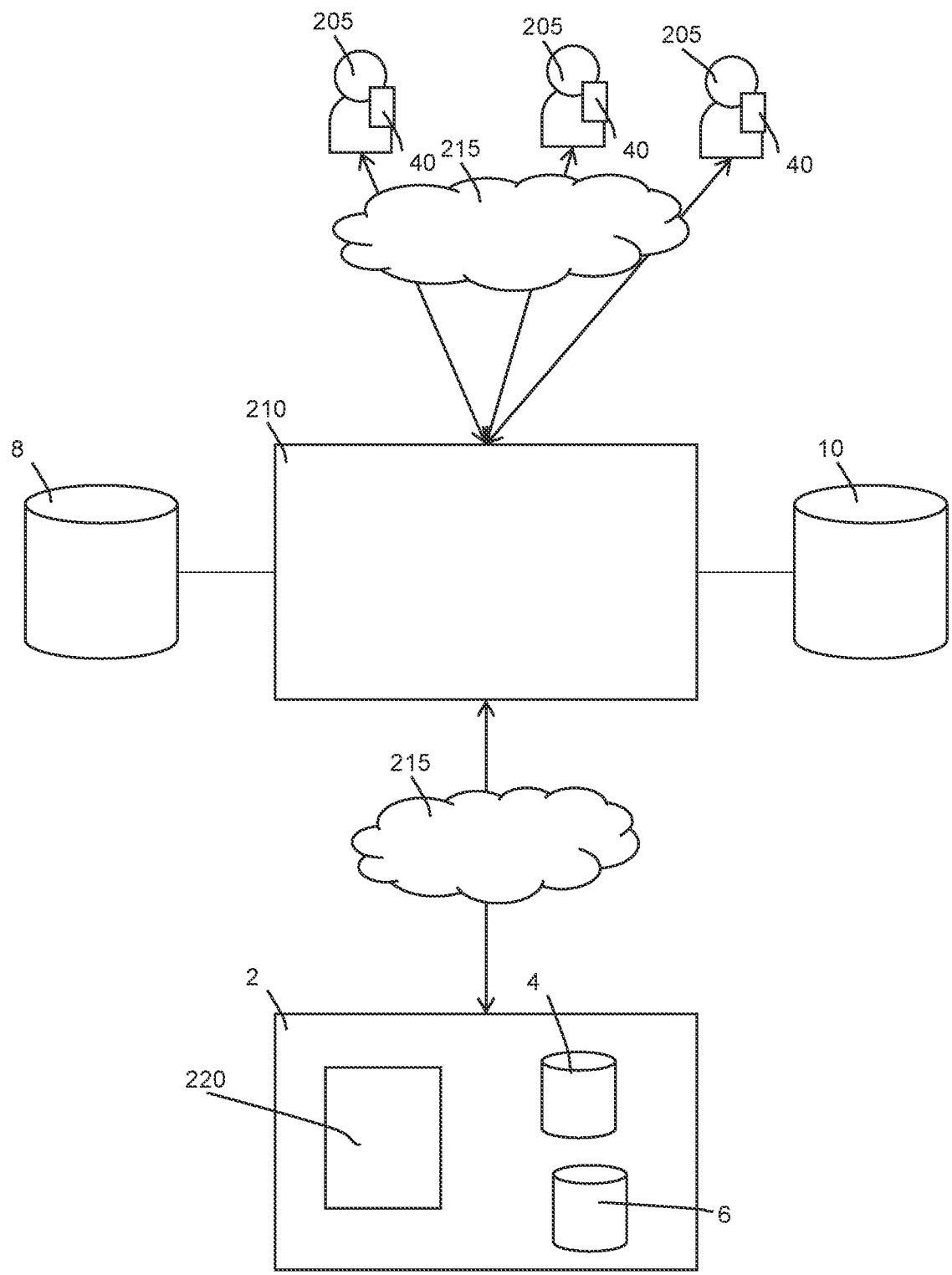
FIG. 3 is a simplified schematic of an alternative system arrangement to that of FIG. 2.

In this embodiment, the content recommendation module 2 further includes a user experience (UX) engine 29 for configuring user content selection interfaces that allow users 205 (see FIGS. 2 and 3) to navigate and select content from a content service provider (210, also shown in FIGS. 2 and 3). In particular, the UX engine 29 can be used to provide customised user content selection interfaces that are customised or otherwise specifically configured to a specific user 205 or group of users 205. The customization comprises customizing the order in which groups of content is presented to a user 205 or groups of users 205 so that groups of content more likely to be of interest to the user 205 are presented earlier, or in preference to groups of content that are less likely to be of interest to that user 205.

The content recommendation module 2 further includes a user profile module 28. As discussed in more detail below, the user profile module 28 is operable to use first party data obtained by an operator of the system to determine user activity profiles of individual users 205 or sets of users 205, which are representative of actions of a user 205 with respect to content selection interfaces FIG. 1 shows a request for recommendation for the user being received by the content recommendation module 2. FIG. 1 also shows a user action being received by the content recommendation module 2. FIG. 1 also shows a user inputted search term being received by the content recommendation module 2, specifically the adaptive search module 26. In addition to receiving requests for recommendations and search terms, the content recommendation module 2 is configured to log user activity. By logging user activity and storing activity over an extended period of time, the content recommendation module 2 and the hard disk storage 4 can build up an overall picture of the viewing activities, habits and preferences of a plurality of users. Certain user actions are turned into learn actions by the user learning module 24. The learn action may be processed by the user profile module 28, the UX engine 12 and the content recommendation engine 22 as well. The user profile module 28 may store user data on the hard disk storage 4 to generate and update one or more user profiles for users 205.

The system of FIG. 1 is configured to operate with a plurality of user devices (not shown) each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user device is communicatively coupled to the content recommendation module 2. The CRE 22 of the content recommendation module 2 has an application programming interface (the recommendation engine API) that provides a set of rules for search and recommendation requests to be communicated between the user device and the CRE 22. The user device is configured to send an inputted search term to the adaptive search module 26 which is configured to send a search request to the CRE 22 which returns one or more content recommendations.

The user cache 6 is coupled to the content recommendation engine 22 and is configured to store data for the content recommendation engine 22. The content recommendation module 2 can access data stored on the user cache 6. The user cache 6 may be provided in random access memory (RAM).

The hard disk storage 4 is communicatively coupled to the content recommendation module 2. The hard disk storage 4 stores data for use by the content recommendation module 2. The hard disk storage 4 is configured to store one or more databases. Entries from the databases on the hard disk storage resource 4 can be retrieved by the content recommendation module 2 via requests made through the data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 30 that represent user service requirements, at least one language table 32, at least one user profile table 34 that includes user attribute data that may be considered to represent a user profile, a PVR table 36 and a learn action table 38.

The learned language table 32 stores data relating to audio languages of content items that have been user actioned by the user. For example, the feedback table can store learned language information, the date at which the language was learned and an indication of whether or not the entry has been aged out.

A user profile, which is stored in the user profile table 34, may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

The PVR table 32 stores metadata or other information concerning items of content stored on at least one PVR, e.g., PVR 20a, 20b, . . . 20n, substantially without duplication (for example, substantially the same amount of data is stored regardless of whether an item of content is stored on one, thousands or millions of PVRs) the amount of storage required, and data access times can be reduced. This can be particularly significant in systems such as that of FIG. 1 which may be required to provide real-time personalized content recommendations to thousands, tens or hundreds of thousands, or millions of users subject to strict time constraints.

Additionally, in the embodiment of FIG. 1, the tables stored on hard disk storage device 4 may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in a learn action table 38. The learn action (i.e., stored data item) may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier).

The learning tables described, e.g., the learn action table 38, a distinction is made between different types of user and different sets of the tables are stored for the different types of users.

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

Returning now to FIG. 1, the adaptive search module 26 receives a search term from a user. The user inputs the search term via one or more input devices, e.g., a television remote of a television, a mobile device, a microphone which receive audio input, etc. Inputting the search term may be time consuming and inefficient, specially inputting a search term via a television remote which is not designed for inputting text characters. As such, it is desirable to limit the number of characters inputted, i.e., minimise the length of the inputted search term, necessary for a user to discover content of interest. The adaptive search module 26 receives the search term and sets one or more search parameters based on the inputted search term. A search request is then generated based on the inputted search term and the search parameters. The search request is received by the CRE 22 which generates one or more content recommendations. The content recommendations may be based on user data or user learning performed by the user learning module 24. The content recommendations are then returned to the user, i.e., displayed on the user device. The adaptive search module 26 manages search requests.

Figure 4:
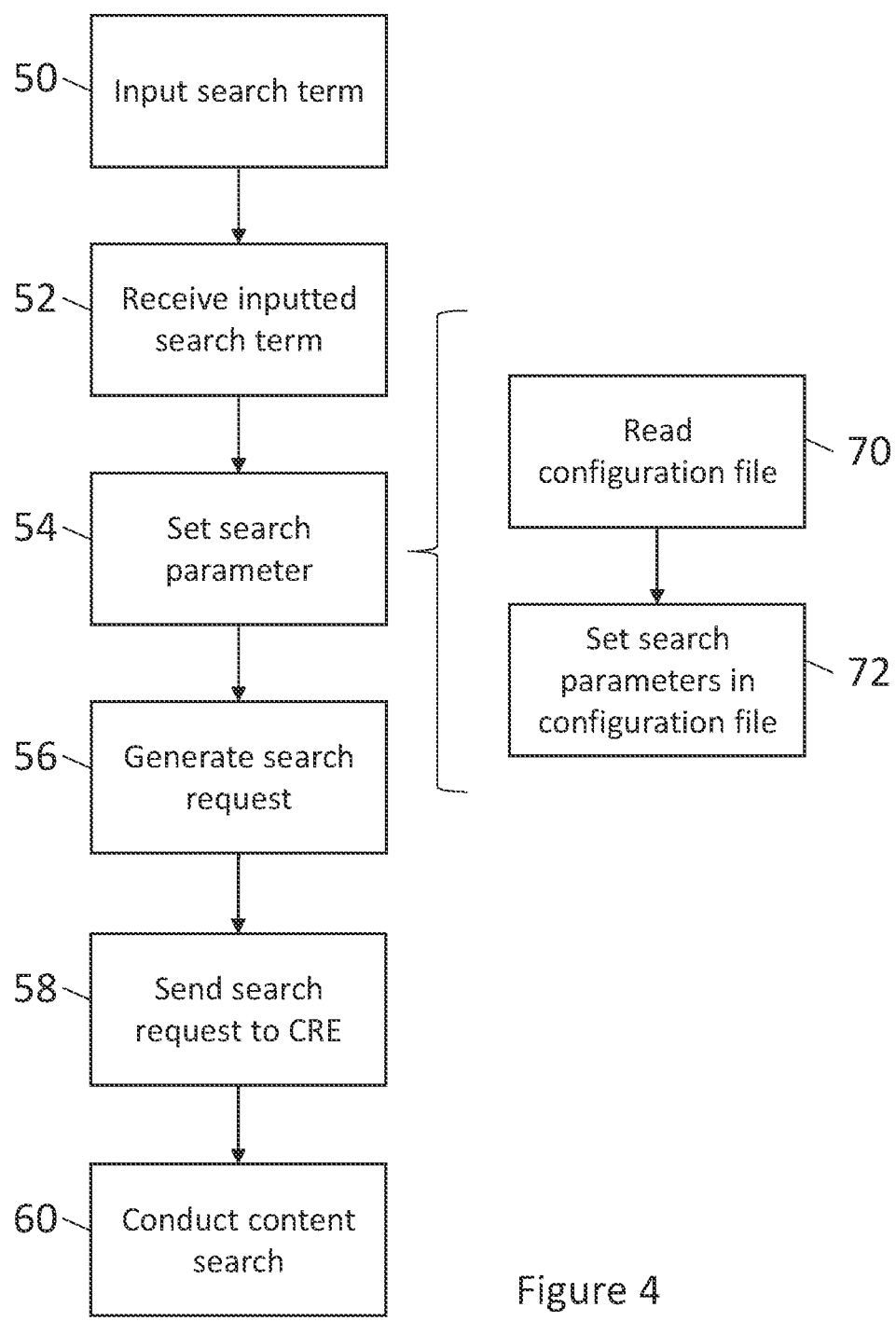
FIG. 4 is a flow chart of a method of managing search requests.

Operation of the adaptive search module 26 is illustrated in FIG. 4. At step 50, the user inputs a search term. The user inputs text via an input device, e.g., a television remote on a display such as a television. At step 52, the adaptive search module 26 receives the inputted search term. The search term is text, i.e., one or more text characters. The search term may be text which is converted from inputted audio via a speech to text module which may form part of or be external to the module 2.

At step 54, the adaptive search module 26 sets one or more search parameters. In this embodiment, the search parameters based on a length of the search term as will be described.

At step 56, a search request is generated. The search request is based on the inputted search term and the set search parameters. The search request is generated based on the inputted search term and the search parameter. For example, the search request may include the search term with a wildcard character added to the end, and the popularity search parameter set to true to apply an increased weight to popular content.

At step 58, the search request is sent to the CRE 22. At step 60, the CRE 22 conducts a content search based on the received search request. The CRE 22 then provides one or search results, or content recommendations based on the search request. The content recommendations are provided to the user. The user may then select the content of interest. By adapting the search request, i.e., adapting the search parameters, as the user enters the search term, the results of the search may be more relevant to the user. This may result in fewer characters needed to be entered by the user to discover relevant content. This may reduce user churn, and improve usage of the content recommendation system.

Further detail of step 54 is illustrated in FIG. 4 in steps 70 and 72. In step 70, the adaptive search module 26 reads a configuration file. The configuration file is in the XML file format. The module 26 may read the configuration file upon start-up of the content recommendation module 2. For example, the XML configuration file may be read prior to the user inputted the search term. The configuration file defines the search parameters which are to be set based on the inputted search term. For example, the configuration file may indicate the following search parameters are to be set based on the inputted search term: sort mode, search fields, popularity, wildcard, boost watched series, Boolean operator and phrase. In step 72, the search parameters in the configuration file are set based on the inputted search term, specifically, based on a length of the search term.

An exemplary configuration file is illustrated in FIG. 5. The search parameters present in the configuration file are sort mode, search fields, popularity, wildcard, boost watched series, Boolean operator and phrase. The configuration file is loaded into the adaptive search module 26. The search parameters are set according to the rules in the configuration file based on the inputted search term, in particular the length of the inputted search term. A brief description of each element of the configuration file of FIG. 5 is provided below.

<TermConfig termLength="1" addPhrase="true" useAnd="false"> termLength—The required length of the entire search term for which this search parameter will be activated. In other words, when the search term has a length of 1, i.e., only 1 character was entered as the search parameter.

addPhrase—Whether a phrase that includes the entire search term should be automatically added. As shown in FIG. 5, this search parameter (i.e., phrase) is set to True when the search term has a length of 1.

useAnd—This element makes each word in the search term mandatory, i.e. performs a Boolean AND operation. As illustrated in FIG. 5, the AND Boolean operator is not being used when the character length of the search term is 1. In other words, the Boolean operator is set to OR (i.e., not AND) when the search term length is 1.

The term length is applicable to all search parameters in the configuration file.

<SortMode mode="relevance"/>

This feature sets the sort mode search parameter. As shown in FIG. 5, this search parameters is set to relevance when the search term length is 1. When the sort mode is set to relevance the sort mode when displaying results of the search may display the results according to relevance, i.e., most relevant searches being displayed first. In other words, the sort mode search parameters sets the display mode to use when sorting search results. Other possible search modes may be relevance, ascending, descending and preferences. Ascending and descending may display results according to ascending and descending date of release. Preferences may present the search results according to predefined user preferences of the user which input the search results.

```
<Popularity enabled="true">
<PopularityScale>1</PopularityScale>
</Popularity>
```

This portion of the configuration file relates to a popularity search parameter. The popularity search parameter may reflect a collaborative or global (of all users) popularity of content. Popularity enabled (i.e., the popularity search parameter set to true) applies an increased weight to content deemed to be popular.

The popularity scale indicates how much additional weighting should be applied to popular content when conducting the search according to the inputted search term. The popularity search scale may form part of the popularity search parameter, or may be an additional search parameter.

A PopularityScale of 1 means use 100% of popularity score and a value of 0.5 means 50%. The PopularityScale of 1 applies the increased weight at 100% of its value, while the value of 0.5 applies 50% of the weight to the popular content.

```
<Wildcard enabled="true" maxWordLength="1"
    value="*"/>
```

Wildcard is a search parameter which is enabled, i.e., True, in this configuration file. The wildcard search parameter being enabled adds a wildcard character to the inputted search term. Specifically, the wildcard search parameter adds a wildcard character when the search term is less than the maxWordLength, i.e., less than or equal to 1. When the search term is greater than 1, no wildcard character is added. The value is the wildcard character which is added. In this embodiment, the wildcard character is "*".

The wildcard may also apply to special characters. For example if the user enters a special character such as "è" in the search term, it may indicate the user is unsure of the spelling of the search term. The wildcard search parameter may enter a wildcard to this special character to search for the entered "è" in addition to "é" and "e". This may increase the likelihood of relevant content being found when conducting the search.

```
<BoostWatchedSeries enabled="true">
<PrevEpisodeWeight>0.6</PrevEpisodeWeight>
<NextEpisodeWeight>0.9</NextEpisodeWeight>
<FutureEpisodeWeight>0.75</FutureEpisodeWeight>
</BoostWatchedSeries>
```

This portion of the configuration file relates to a BoostWatchedSeries search parameter. This search parameter applies a weight to a watched series such that the watched series is more likely to appear in the search results. How much a particular episode of the series or program is boosted is set depending on whether the episode is the next, previous or future episode. In this embodiment, the previous episode has a boost of 0.6 (60%), the next episode has a boost of 0.9 (90%) and the future episode has a boost of 0.75 (75%). The greater the boost, the more likely an episode will appear in the search results. A boost of 0 indicates no boost is applied at the episode will only appear in the search results based on relevance to the search term. If the next episode is in the search results, it will be returned (presented) before any other search result.

```
<SearchFields>
<Fieldname>title</Fieldname>
<Fieldname>seriestitle</Fieldname>
</SearchFields>
```

This portion of the configuration file relates to the field search, the search field search parameter. The search fields may vary depending on the inputted search term. In this embodiment, the search field parameter is title and series title. Other possible search fields include "actor", i.e., lead or supporting actor; "director"; "people", i.e., any actors, directors, writers, etc. associated with the content; and "description".

While a particular configuration file has been described and illustrated in FIG. 5, other configuration files may be loaded. For example, a configuration may be loaded when the character length is 5. When the character length is 5, the Boolean operator may be set to AND, and the phrase search parameter may be set to True as the user may be more certain of the content they are interested in viewing. The Boost watched series may be set to False as the user may be less interested in watching previously viewed content if they are entering a longer search parameter, i.e., a longer text search string.

As a user enters the search term, the search parameters may change. In particular, the search parameters may change based on a length of the search term. Such progression of search parameters is illustrated in FIGS. 6a-6d. In FIG. 6a, the search term comprises "to" as shown at 80. As the search term length is less than 3, the method may add a wildcard character to the search term, i.e. "to*" and conduct a wildcard search at 82. The method may also set the popular search parameter to true to increase the weight of popular content. This is based on the presumption that a shorter search term indicates the user is likely to know the specific content of interest. Conducting a wildcard search and setting the popular search parameter to true or enabled may increase the likelihood of relevant content being presented to the user.

As the user continues to input the search term, the search term becomes "tom" at 84. The wildcard search parameter is set to false or disabled at 86 such that a fuzzy search of the search term is performed instead. The wildcard search parameter is set to false based on the length of the search parameter being 3. The search parameter search field may also be set to "title" based on the length of the search parameter being 3.

At 90, the user continues to enter the search term and the received inputted search term is now "tom c". The Boolean operator search parameter is now set to "AND" at 86 as the user has entered a space between to text strings, "tom" and "c". The default Boolean operator search parameter may be "OR". The search request will therefore look for string "tom" and "c".

At 94, the user continues to enter the search term and the received inputted search term is now "tom cru". Based on the search term exceeding a pre-set length, e.g., 5 characters, the phrase search parameter may be set to "True" or enable.

The search request will now be the search term "tom cru" and the search parameter phrase such that content having a phrase including the search term will be returned as part of the search results.

As illustrated in FIG. 6a-6d, the search parameters are changed, i.e., different search parameters are set or search parameters are set differently, based on a length of the search term. As the search term length increases the search parameters. The search request is adapted based on the changing search parameters. The results of this adapting search request are more likely to be of interest to the user thereby reducing user churn, and improving the quality of the search.

Each individual feature described herein is disclosed in isolation and any combination of two or more features is disclosed to the extent that such features or combinations are capable of being carried out based on the present specification as a whole in the light of the common general knowledge of one of skill in the art, irrespective of whether such features or combination of features solve any problems disclosed herein, and without limitation to the scope of the claims. Aspects of the disclosure may consist of any such individual feature or combination of features. In view of the foregoing description it will be evident to one of skill in the art that various modifications may be made within the scope of the disclosure.

It should be understood that the examples provided are merely exemplary of the present disclosure, and that various modifications may be made thereto.

What is claimed is:

1. A computer-implemented method of managing search requests to a content recommendation engine (CRE), the CRE adapted to receive search requests and provide one or more content recommendations based on the received search requests for a user of a content distribution system having a plurality of users, the method comprising:
   receiving an inputted search term via one or more input devices;
   setting one or more search parameters based on the search term;
   adaptively modifying search parameters in real-time based on analyzing character length thresholds of the inputted search term to dynamically adjust between wildcard, fuzzy, and exact matching search modes for optimizing search performance across millions of simultaneous content recommendation requests;
   generating a search request including the inputted search term and the one or more search parameters, the one or more search parameters adapted based on the search term;
   sending the search request to a recommendation engine for providing search results;
   conducting a search based on the search request; and
   providing search results based on the search request.

2. The method of claim 1, wherein the search term is text-based.

3. The method of claim 1, wherein setting the one or more search parameters comprises setting the one or more search parameters based on a user profile.

4. The method of claim 1, further comprising determining the number of characters in the inputted search term.

5. The method of claim 4, wherein setting the search parameters comprises setting the search parameters based on the determined number of characters.

6. The method of claim 1, wherein the search parameters comprise at least one of sort mode, search field, wildcard, popularity, boost watched series, Boolean operator, and phrase.

7. The method of claim 6, furthering comprising setting the sort mode, based on the inputted search term, to one of: alphabetical, popularity, relevance, ascending, descending, and preferences.

8. The method of claim 6, further comprising setting the search field based on the inputted search term, to one or more of:
   title, series title, actor, director, people, and description.

9. The method of claim 6, further comprising setting the wildcard, based on the inputted search term, to one or more of:
   add wildcard before search term, add wildcard after search term, both wildcards, and no wildcard.

10. The method of claim 6, further comprising setting the popularity, based on the inputted search term, to one or more of:
    applying a weight to one or more content items.

11. The method of claim 6, further comprising setting the boost watched series, based on the inputted search term, to one or more of:
    applying a weight to one or more content items.

12. The method of claim 11, wherein the content items comprise a previously-viewed content item.

13. The method of claim 6, further comprising setting the Boolean operator, based on the inputted search term, to one of
    AND, and OR.

14. The method of claim 1, wherein setting the one or more search parameters comprises generating a configuration file.

15. The method of claim 14, wherein generating the search request comprises generating the search request based the inputted search term and the configuration file.

16. The method of claim 1, further comprising:
    sending the search request to a content recommendation engine for providing one or more content recommendations.

17. The method of claim 1, further comprising:
    conducting a content search based on the search request.

18. The method of claim 17, wherein conducting the content search comprises conducting a wildcard search or a fuzzy search.

19. The method of claim 1, wherein:
    when the search term length is less than a first threshold of characters, enabling a wildcard search mode by adding a wildcard character to the search term;
    when the search term length equals the first threshold of characters, disabling the wildcard search mode and enabling a fuzzy search mode; and
    when the search term length exceeds a second threshold of characters, enabling an exact phrase search mode.

20. The method of claim 19, wherein the first threshold is three and the second threshold is five.

21. A non-transitory computer-readable medium having computer program code stored thereon, the program code executable by a processor to perform the method of claim 1.

22. A content recommendation system comprising:
    an adaptive search module for managing search requests to a content recommendation engine (CRE), the CRE adapted to receive search requests and provide one or more content recommendations based on the received search requests for a user of a content distribution system having a plurality of users, the adaptive search module comprising:
    a memory storing instructions; and
    a hardware processor coupled to the memory and configured to execute the stored instructions to:

receive an inputted search term via one or more input devices;
set one or more search parameters based on the search term;
adaptively modify search parameters in real-time based on analyzing character length thresholds of the inputted search term to dynamically adjust between wildcard, fuzzy, and exact matching search modes for optimizing search performance across millions of simultaneous content recommendation requests:
generate a search request including the inputted search term and the search parameters, the one or more search parameters adapted based on the search term;
send the search request to a recommendation engine for providing search results;
conduct a search based on the search request; and
provide search results based on the search request.

\* \* \* \* \*